United States Patent [19]

Durand

[11] Patent Number: 4,901,398

[45] Date of Patent: Feb. 20, 1990

[54] PROCESS AND MACHINE FOR PULLING OFF BELLY STRIPS FROM A HOG CARCASS

[75] Inventor: Lucien Durand, Baix, France

[73] Assignee: Société Anonyme: Societe Des Ateliers De Constructions Mecaniques: Lucien Durand, Baix, France

[21] Appl. No.: 312,204

[22] Filed: Feb. 21, 1989

[30] Foreign Application Priority Data

Feb. 23, 1988 [FR] France ................ 88 02436

[51] Int. Cl.[4] .......................... A22B 5/00
[52] U.S. Cl. ...................... 17/1 R; 17/21; 17/50
[58] Field of Search ............ 17/45, 23, 21, 50, 52, 17/46, 1 R; 99/587, 589

[56] References Cited

U.S. PATENT DOCUMENTS

| | | | |
|---|---|---|---|
| 3,916,484 | 11/1975 | Kennedy | 17/23 |
| 4,376,326 | 3/1983 | Noroy | 17/21 |
| 4,417,367 | 11/1983 | Leining | 17/21 |
| 4,438,546 | 3/1984 | Couture | 17/21 |
| 4,667,371 | 5/1987 | Vogt | 17/23 |
| 4,727,623 | 3/1988 | Durand | 17/21 |

FOREIGN PATENT DOCUMENTS 0102337 of 1983 European Pat. Off. .
0245183 of 1987 European Pat. Off. .
2551950 of 1983 France .

Primary Examiner—Willis Little
Attorney, Agent, or Firm—Bacon & Thomas

[57] ABSTRACT

The invention relates to a process and machine usable in mass-slaughtering for pulling off the belly strips from a hog carcass. The machine according to the invention is characterized in that it comprises an optical type sensor comprising a cell mounted on a supporting structure and capable of assessing the height of the suspended hog, between a reference place traversing the hooking bar on which the hog is suspended, and the plane traversing the hog's snout, and capable also to stop the vertical movement of the structure so as to place the head at a height varying between 700 mm and 900 mm above the plane.

17 Claims, 3 Drawing Sheets

PROCESS AND MACHINE FOR PULLING OFF BELLY STRIPS FROM A HOG CARCASS

The present invention relates to the field of mass-slaughtering of hogs and more particularly to the operations of preparation conducted after the slaughtering.

BACKGROUND OF THE INVENTION

The object of the invention is, more specifically, the preparation step which consists, after slaughtering and evisceration, in pulling off or loosening off the two layers of fat lining the inner faces of the hog's sides, these layers of fat being normally known as "belly strips".

One known process for loosening and pulling off such belly strips consists, according to French Patent 2 597 721 (86-06360), in suspending the eviscerated hog carcass by its hind legs, introducing into the hog's open rib cage, a clamp equipped with outwardly-facing active jaws, placing said active jaws substantially inside the plane of the lower ends of the belly strips lining the inner faces of the hog's sides, opening the clamp in order to apply the active jaws against the lower ends of the strips, pressing against the external faces of the hog's sides passive counter-jaws situated in facing relationship to the active jaws, bringing out said active jaws means for gripping the belly strips simultaneously, opening the passive counter-jaws, closing the clamp so as to bring the active jaws close together and pulling off the lower ends of the belly strips gripped by the gripping means, and finally raising up the clamp in order to detach the belly strips from the inner faces of the hog's sides and bringing said clamp out.

Said patent further relates to a machine for carrying out the aforesaid process, which machine comprises a supporting structure movable vertically by means of a motor, over supporting and guiding rails mounted on a frame, a chassis carried by said structure and which is horizontally movable by means of a motor and forms a vertical pivot, and a two-branched clamp mounted on the pivot.

The process and machine according to said patent have been found satisfactory for gripping, pulling and loosening off the belly strips.

Practical use, however, has revealed that control of the machine in automatic working of the process did raise a problem, heretofore unsolved, resulting from the succession, in an automatic slaughtering line, of hogs of different morphology and sizes, and also suspended at different heights.

To perform a completely automatic process, it is important for the belly strips to be gripped in the vicinity of their lower part. Yet, the fact that these lower parts are situated in the horizontal plane, makes way for considerable variations linked to the morphology and size of the hogs.

In a mass-slaughtering line, differences in sizes of suspended hogs of between 1,500 mm and 2,200 mm may be found.

Such differences make it difficult to define a gripping and stripping plane common to all the hogs moving in the line, and as a result, the operation of the machine and implementation of the process described in the aforesaid French patent are often found to vary in efficiency.

SUMMARY OF THE INVENTION

It is the object of the present invention to solve the aforesaid problem by providing improvements to the known means which will allow the completely automatic determination of a reference plane corresponding to the lower parts of the belly strips which are to be gripped, pulled off and loosened off, regardless of the morphology and the suspended height of the hogs arriving successively at a fixed station or moving continuously in front of the belly strips pulling off machine.

This object is reached according to the invention with a machine for pulling off belly strips from a suspended hog carcass, of the type comprising a supporting structure which can be moved vertically by a motor over support and guide rails mounted on a frame, a chassis carried by the structure and which can be moved horizontally by a motor and forms a vertical pivot, a clamp equipped with two parallel jaws which are in the form of a penetrating head capable of being introduced between the lips of the thoracic opening of a suspended hog in order to grip and pull off the belly strips lining the inner faces of the hog's sides, and a sensor for sensing an approximate plane traversing the base of the belly strips for stopping the vertical movement of the supporting structure, machine wherein the sensor is an optical type sensor and comprises a cell mounted on the structure and capable of assessing the height of the suspended hog, between a reference plane traversing the beam on which the hog is suspended and a plane traversing the hog's snout, and capable also of stopping the vertical movement of the structure in order to place the head at a height varying between 700 mm and 900 mm above the plane traversing the snout.

BRIEF DESCRIPTION OF THE DRAWINGS

The invention will be more readily understood on reading the following description with reference to the accompanying drawings in which.

DETAILED DESCRIPTION OF PREFERRED EMBODIMENTS

The technical field of the invention is that of the mass-slaughtering of hogs P which, after being slaughtered, are suspended by their hind legs and by means o a hooking bar 1 to a conveyor 2 driving them continuously or stepwise in front of attending stations.

After slaughtering, the hogs P are scalded, depilated, singed, brushed and eviscerated, that is to say that they are opened down the abdominal face, as well as down the rib cage, in such a way as to provide an access for removing viscera and offals. After this operation, the hogs P are brought, successively, by the conveyor 2 in front of a station I where the two belly strips p which are constituted by lumps of fat and line the inner faces of the open sides 3 of the hog P, are pulled and loosened off. Said belly strips p generally extend from a lower level corresponding substantially to the second front teat to substantially half of the abdomen.

The object of the invention is to carry out the pulling off and loosening of the two belly strips, automatically and without using the hands, and regardless of the hog's morphology, the lower part of the belly strips being gripped firmly.

Figure 1:
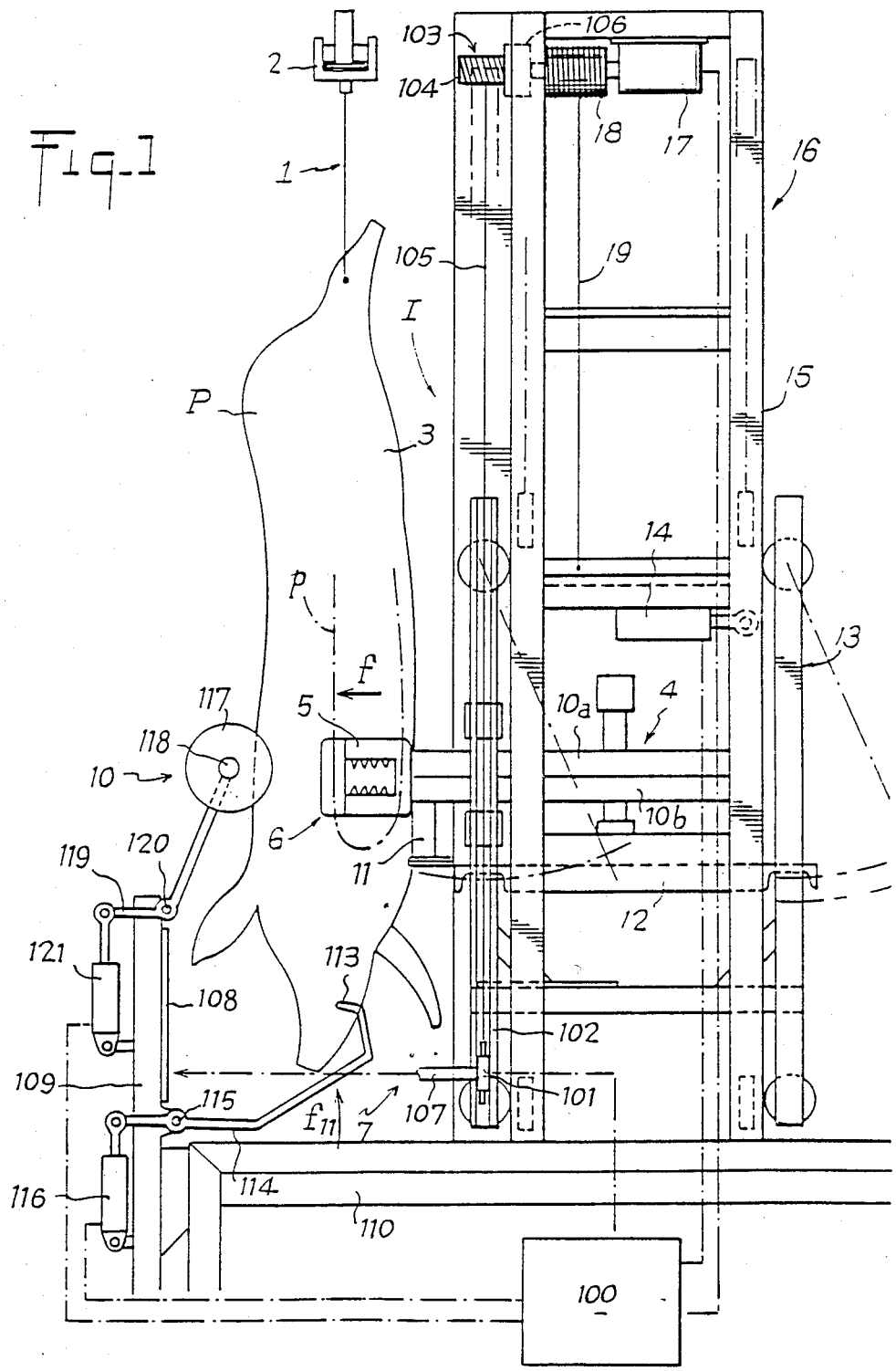
FIG. 1 is a diagrammatical elevation illustrating the process and the machine according to the invention.

To this effect, as illustrated in FIG. 1, the invention consists in bringing opposite the thoraco-abdominal opening of a slaughtered and eviscerated hog P suspended by its hind legs, a clamp 4 equipped with two parallel jaws 5, shaped so as to form a penetrating head 6 capable of being introduced between the lips of the opening. Clamp 4 is particular in that it comprises jaws 5, which are active from their opposite external side faces.

A second step in the process consists in introducing the head 6 inside the hog as illustrated by arrow f, and in bringing said head 6 substantially within the horizontal plane of the lower end portions of the belly strips p, namely close to the second front teats.

The stopping of head 6 in the required position is automatically controlled via a sensor 7.

According to another step of the process, the clamp 4 is controlled to open the jaws 5 which are drawn apart inside the carcass, so as to be applied against the lower end portions of the belly strips p.

According to yet another step of the process, the jaws 5 are controlled for gripping the lower ends of the strips p with their active members.

When the active members or gripping means have grasped the belly strips, the jaws 5 are brought back close together, these pulling off the end portions of the belly strips p from the inner faces of the hog's sides 3.

A subsequent step in the process then consists in moving the clamp 4 according to an upward movement from the initial low horizontal reference position. This movement causes as a result the gradual loosening of the belly strips p which are pulled off by the jaws 5 gripping their lower ends. The belly strips p are thus gradually pulled off until the jaws 5 reach a maximum elevation position at which the jaws are opened to release the belly strips before the head 6 is brought out.

The various above-mentioned steps may be carried out in succession, in stationary manner, i.e. when the hog P is brought and then immobilized in front of station I, or in movable manner, i.e. while the hog P is driven continuously. In such a case, the different movements imparted to the clamp 4 are combined with a concomitant translation at the same speed and in the same direction as the movement imparted to the hog P by the conveyor 2.

In both cases, the step of introducing the penetration head 6 from the base of the thoracic opening is, preferably conducted while the hog P is resting against a back support 10 which prevents said hog P from swinging or moving during said introduction of head 6.

For carrying out the above-described process, clamp 4 is equipped with two branches 10a and 10b which are mounted for pivoting on a vertical pivot 11 carried by a chassis 12 mounted on a supporting structure 13. Chassis 12 may be moved relatively by a suitable driving member 14 in the direction of arrow f from the rest position illustrated in FIG. 1. In the diagrammatically illustrated example, the connection between the chassis and structure 13 is pendulum type. But it is understood that any other adaptation is possible to perform the same function.

The supporting structure 13 is mounted for moving vertically on guide rails 15 formed by a frame 16 facing the conveyor 2 while being integrated into a mass-slaughtering line. The supporting structure 13 can be moved vertically according to an upward or downward movement via a driving member 17 comprising for example a drum 18 for winding or unwinding a suspension cable 19 or the like fastened to the upper part of structure 13.

The sequential operation of the clamp 4 and of the driving members 14 and 17 is controlled by a control unit 100 for selectively and relatively regulating the start and end of operation of each one of said driving members, whether these are hydraulic, pneumatic or electric. To this effect, unit 100 should be considered as depending of the prior art without any direct connection with the object of the present invention. And for this reason, unit 100 will not be described any further herein, nor will the clamp 4 whose structure is described in detail on the main patent application.

The present invention results from the great variety of morphological characteristics noted in the hogs P of a mass-slaughtering line, generally coming from various breeds and different stocks.

Figure 2:
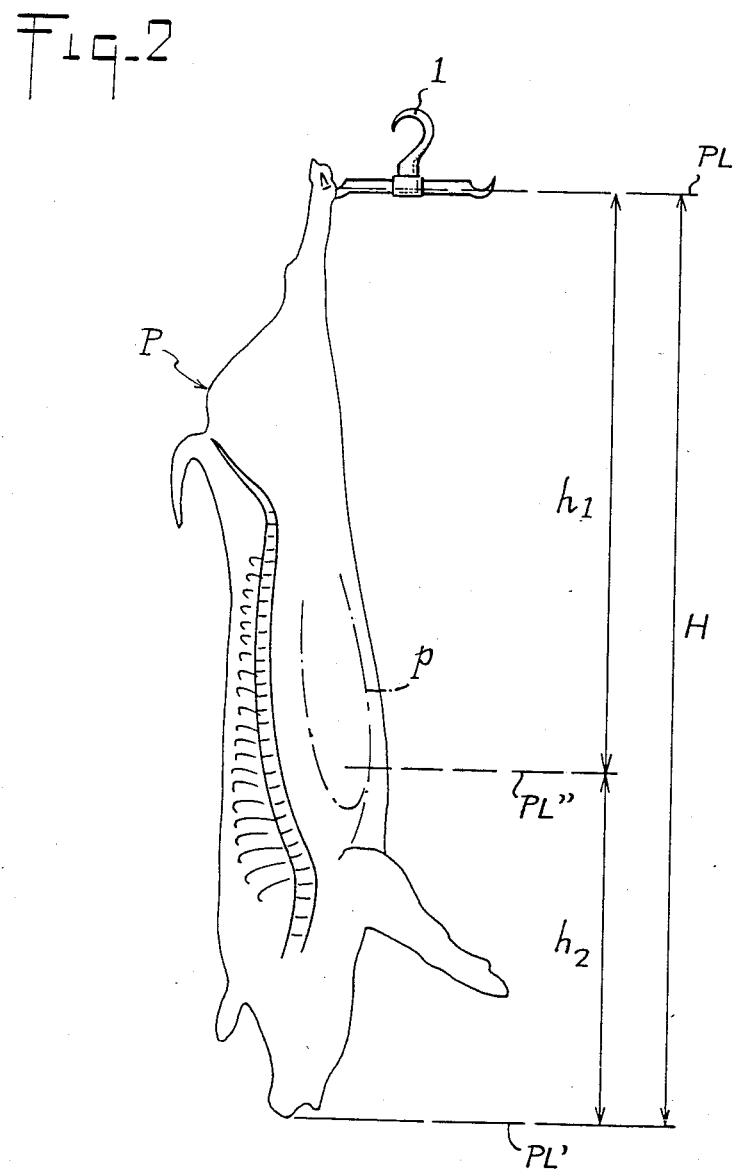
FIG. 2 is a diagrammatical elevation illustrating the conditions to be worked out when carrying out the process.

FIG. 2 diagrammatically shows the morphological characteristics which should be taken into account in order for the machine to work automatically in carrying out the afore-described process, starting with a firm gripping of the lower end portions of the belly strips p, whatever the morphology of the hogs reaching in succession the attending stations.

Experiments have revealed that, taking as a basis a hog height H measured between an upper horizontal reference plane PL corresponding to the hooking bar engaging the hind legs of the hog and a horizontal plane PL' passing through the snout of said hog, it is possible to determine, proportionally, the measurements of heights $h_1$ and $h_2$ respectively comprised between a fictitious plane PL" situating the lower ends of the belly strips p of the hog and, on the one hand, the plane PL, and on the other hand, the plane PL'. It can be considered, from the experimental measurements that have been made statistically, that the fictitious plane PL" is situated with respect to the plane PL', at a height $h_2$ varying between 700 mm and 900 mm.

In order to be able to meet the above requirement when carrying out the process, and to make sure that the active jaws of the head 6 are brought substantially inside reference plane PL", the process according to the invention consists in determining the height H, and then placing the head 6 substantially in plane PL" after determining height $h_2$.

According to the invention, said height is determined by means of an optical-type sensor 7, carried by the structure 12 while being movable relatively to the latter.

In a preferred embodiment of the process, optical sensor 7 is mounted on a carriage 101 which is guided for sliding on a guide rail 102 carried by the structure 13, in such a way as to extend in parallel to the guide rails 15 of the frame 16. Carriage 101 is connected to a driving member 103, whose role is to impart it with a moving speed according to a reciprocal rectilinear movement synchronous with the movement of the structure 13 on the rails 15. The synchronous displacement is so arranged that the carriage 101 moves, at least in the downward phase, from the high position of reference illustrated in dash and dot lines in FIG. 1, at a speed proportionally higher by about 16/9 than the moving speed of the structure 13 controlled by the motor 17. This proportionally higher speed can be generated by an independent driving member, or even by driving member 17, by providing for example a drum 104 for winding or unwinding a cable 105 to which the carriage 101 is coupled. The proportionally higher speed ratio can be worked out between the drum 104 and the drum 18, either by a multiplying gear 106, or by suitable selecting the diameter ratio between these two drums.

Optical sensor 7 comprises an emitting cell 107 which is connected to power unit 100. Cell 107 is so directed as to emit a light beam in the direction of a reflecting surface 108 which is carried by an upright member 109 rising up from the base 110 of the frame 16. Upright member 109 is placed in such a way that a hog P, moved by conveyor 2, is brought to rest or to pass in front of the reflecting surface 108, with respect to which the hog snout constitutes a mask for the cell 107 as long as said cell does not occupy such a sufficiently low level for the beam that it emits to be directed onto the reflecting surface 108.

The means according to the invention described hereinabove work as follows.

Supposing that a hog P is brought in stabilized condition against the back support 10 facing the station I, the cycle starts by the control of the supply of motor 17 via power unit 100 detecting the presence of the hog P. Motor 17 controls the downward movement of the supporting structure 13 from the high position such as shown in dash-and-dot lines in FIG. 1. Said structure 13 goes down at a given speed, carrying with it the clamp 6 occupying it retracted position as illustrated by the dash-and-dot lines position of the chassis 12 controlled by the motor 14.

Simultaneously, carriage 101 is moved downwardly on the rails 102 carried by the structure 13. The cell 17 moves as explained hereinabove.

While the emitting cell 107 moves in front of the hog P which hides its light beam, power unit 100 keeps up the supply to the motor 17. As soon as cell 107 emits a light beam reaching to the reflecting surface 108, power unit 100 is controlled to stop the motor 17, thereby immobilizing the cell 107 on the structure 13 and the latter on the frame 16 in a position in which the head 6 is situated substantially on plane PL''.

Then, power unit 100 controls the motor 14 to cause the displacement of the chassis 12 in the direction of arrow f and to ensure the penetration of the head 6 inside the rib cage of the suspended hog P.

Clamp 4 can then be operated in the conventional way, with the certainty that the active jaws of the head 6 will be able to grip the lower end portions of the belly strips p with a view to pulling these off as soon as clamp 4 closes. Such closure reverses the cycle via power unit 100 ensuring the supply to motor 17 in reverse so as to cause the rising up of the structure 13 and, simultaneously, that of cell 7. During this step, the jaws of the clamp 4 cause the loosening off of the belly strips p which have been gripped firmly and in the right part, due to the determination of the most favorable plane PL''.

Figure 3:
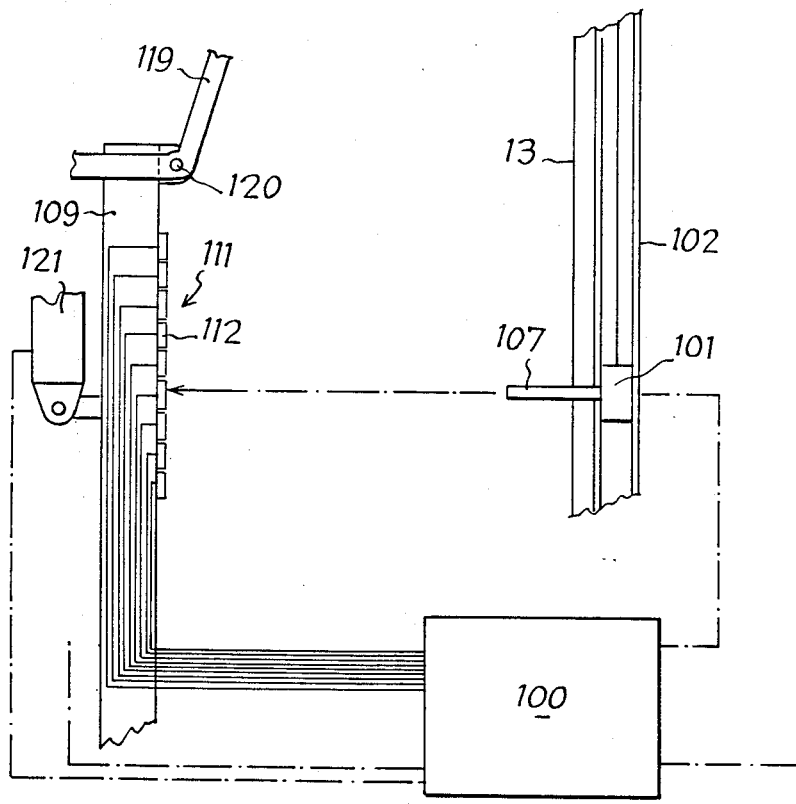
FIG. 3 is a diagrammatical view illustrating a variant embodiment of the machine according to the invention.

According to a variant embodiment illustrated in FIG. 3, the counterpart 108 of emitting cell 107 is constituted by an array 111 of optical sensors 112, stepped vertically on the upright member 109 and connected, respectively, to the power unit 100 to which each one supplies an electrical signal as soon as the light beam reaches them from the emitting cell.

The determination of the reference plane PL'' appears to be particularly important in order for the process to work automatically whenever a hog P reaches the station I.

It has however been noted that it is also advisable to take other steps in order that the gripping or grasping of the lower end portions of the belly strips p can be safely achieved and kept up during the loosening phase by the rising movement of the structure 13. Another factor to be considered is the firm immobilization of the hog P in order to prevent any tendency for the lower end portion of the hog, which generally is constituted by the head, to move upwardly or swing.

To this effect, the invention proposes to introduce a step in which the lower part of the hog is immobilized as soon as the cell 7 has detected the presence of reference plane PL'. Such immobilization is achieved by means of a hand 113 adapted on the end of an arm 114 mounted for pivoting about a pin 115 carried by the upright member 109. Arm 114 is connected to a jack 116 whose supply is controlled by power unit 100. As soon as the cell 107 issues a signal corresponding to plane PL' to the unit 100, said unit controls the supply to jack 116 by pivoting the arm in the direction of arrow $f_{11}$, in such a way as to engage the hand 113 preferably behind the lower jawbone to exert a pulling force on the hog P suspended on the hooking bar 1, and at the same time pressing the hog P against the back support 10.

In this position, the active jaws of the clamp 4 can work with maximum efficiency.

The opening of arm 114, with a view to releasing the lower part of the hog P, is controlled by power unit 100 just before the cycle phase corresponding to the return of chassis 12 to the position releasing the clamp 4. Then jack 116, by elastic restoring force or by reverse feeding, returns the hand 113 in the retracted position.

According to one development of the invention, it is also proposed to constitute the back support 10 in the form of a set of runners 117, for example as an auxiliary wheel assembly, mounted on an axle 118 carried by a lever 119 mounted for pivoting on a pin 120 fast with upright member 109. The lever 119 is coupled to a driving member, such as a jack 121 adapted to control, either the retraction of the auxiliary wheel assembly 117, or its displacement, with a view to cooperating with the back bone of the hog P. Supply to jack 121 is controlled via power unit 100, initiated in this case, by a sensor sensing the passage or the presence of a hog P in front of station I.

The invention is not in any way limited to the description given hereinabove and on the contrary covers any modiifications that can be brought thereto without departing from its scope. For example, it would be possible to provide a telescopic upright member 109 permitting to adapt several ranges or types of controls as a function of the variations of height H.

What is claimed is:

1. Machine for pulling off the belly strips from a hog of the type comprising means for suspending an eviscerated hog carcass by means of a hooking bar engaged in the Achilles tendon of the hog's hind legs, in order to introduce in the open rib cage of the hog, a clamp comprising jaws with outwardly directed active members, to place the active jaws substantially inside the plane of the lower end portions of the belly strips lining the inner faces of the hog's sides, with a view to gripping said end portions and pulling them off, and then to raise the clamp for pulling off the strips, machine wherein, in order to define the plane of the lower end portions of the belly strips, means are provided for:

determining the vertical height (H) of the suspended hog between a horizontal plane (PL) traversing the hooking bar engaged in the Achille's tendons, and a horizontal plane (PL') traversing the hog's snout, placing the clamp at a height ($h_2$) varying between 700 and 900 mm from the plane (PL').

2. Machine as claimed in claim 1, wherein means are provided for automatically placing the clamp at a suitable height, by using an optical detection of measurement (H) by a cell moving vertically in parallel to the clamp.

3. Machine as claimed in claim 2, wherein means are provided for simultaneously moving the clamp and the cell via driving members whose supply is interrupted by the optical detection by the cell of measurements (H).

4. Machine as claimed in claim 3, wherein means are provided for moving the cell downwardly at a speed proportionally higher than the downward moving speed of the clamp.

5. Machine as claimed in claim 4, wherein the downward moving speed of the cell is proportionally higher by about 16/9.

6. Machine as claimed in claim 2 wherein means are provided for communicating the result of the optical detection of measurement (H) to a movable cell comprising an emitting source capable of cooperating with a reflecting surface adapted on a fixed support placed at the opposite side of the suspended hog with respect to the emitting source.

7. Machine as claimed in claim 2, wherein means are provided for communicating the result of the optical detection of measurement (H) to a movable cell comprising an emitting source capable of cooperating with an array of optical sensors stepped vertically on a support situated in opposite relationship to the cell with respect to the suspended hog.

8. Machine as claimed in claim 1, wherein means are provided for immobilizing the hog suspended by its lower part, following the optical detection of measurement (H).

9. Machine for pulling off the belly strips from a suspended hog carcass, of the type comprising a supporting structure which can be moved vertically by a motor over support and guide rails mounted on a frame, a chassis carried by the structure and which can be moved horizontally by a motor and forms a vertical pivot, a clamp equipped with two parallel jaws which are in the form of a penetrating head capable of being introduced between the lips of the thoracic opening of a suspended hog in order to grip and pull off the belly strips lining the inner faces of the hog's sides, and a sensor for sensing an approximate plane permitting the determination of the base of the belly strips, machine wherein the sensor is an optical type sensor and comprises a cell mounted on the structure and capable of assessing the height of the suspended hog, between a reference plane traversing the beam on which the hog is suspended and a plane traversing the hog's snout, and capable also of stopping the vertical movement of the structure in order to place the head at a height varying between 700 mm and 900 mm above the plane traversing the snout.

10. Machine as claimed in claim 9, wherein said sensor comprises an optical emitting source fixed on a carriage guided for relative vertical movement on the structure and driven at least during the downward movement of the structure from a reference position corresponding to a horizontal plane (PL) traversing the hooking bar, at a downward speed proportionally higher than that of the structure, and an optical receiving unit carried by an upright member rising up from the base of the frame of the machine, and in front of which the hog is suspended.

11. Machine as claimed in claim 10, wherein the carriage is moved downwardly at a speed which is proportionally higher by about 16/9 than that of the structure.

12. Machine as claimed in claim 9, wherein the optical receiving unit is constituted by a reflecting surface.

13. Machine as claimed in claim 9, wherein the optical receiving unit is constituted by an array of vertically stepped optical sensors.

14. Machine as claimed in claim 9, wherein the optical sensor controls, after the carriage and structure have stopped moving, the operation of a hand which engages and immobilizes the lower part of the hog against a back support.

15. Machine as claimed in claim 14, wherein the optical sensor controls, prior to the operation of the hand, the extension of a movable back support.

16. Machine as claimed in claim 15, wherein the hand and back support are mounted on the upright member supporting the optical receiving unit.

17. Machine as claimed in claim 10, wherein the upright member is adjustable in vertical position.

* * * * *